US012777315B2

(12) United States Patent
Jeong et al.

(10) Patent No.: US 12,777,315 B2
(45) Date of Patent: Oct. 27, 2026

(54) DISPLAY DEVICE AND WIRELESS CONNECTION CONTROL METHOD THEREOF

(71) Applicant: LG ELECTRONICS INC., Seoul (KR)

(72) Inventors: Ukheon Jeong, Seoul (KR); Sangtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 18/688,567

(22) PCT Filed: Aug. 26, 2022

(86) PCT No.: PCT/KR2022/012829
§ 371 (c)(1),
(2) Date: Mar. 1, 2024

(87) PCT Pub. No.: WO2023/033466
PCT Pub. Date: Mar. 9, 2023

(65) Prior Publication Data

US 2024/0373202 A1 Nov. 7, 2024

(30) Foreign Application Priority Data

Sep. 1, 2021 (KR) ........................ 10-2021-0116360

(51) Int. Cl.
*H04W 4/80* (2018.01)
*H04L 61/5007* (2022.01)
(Continued)

(52) U.S. Cl.
CPC ........... *H04W 4/80* (2018.02); *H04L 61/5007* (2022.05); *H04W 76/14* (2018.02); *H04W 88/08* (2013.01)

(58) Field of Classification Search
CPC ....... H04W 4/80; H04W 76/14; H04W 88/08; H04W 84/12; H04W 4/06; H04L 61/5007
See application file for complete search history.

(56) References Cited

U.S. PATENT DOCUMENTS 8,127,326 B2 * 2/2012 Claussen .......... H04N 21/41265 725/81
2013/0086700 A1 * 4/2013 Cho ...................... H04L 67/125 726/36
(Continued)

FOREIGN PATENT DOCUMENTS

KR 10-2012-0135625 12/2012
KR 10-2013-0066556 6/2013
(Continued)

OTHER PUBLICATIONS

PCT International Application No. PCT/KR2022/012829, International Search Report dated Dec. 1, 2022, 6 pages.
(Continued)

*Primary Examiner* — Curtis A Kuntz
(74) *Attorney, Agent, or Firm* — LEE, HONG, DEGERMAN, KANG & WAIMEY

(57) ABSTRACT

A display device and a wireless connection control method thereof are disclosed. In this case, a method of controlling a wireless connection to a device by a display device operating as an access point comprises the steps of: broadcasting a first signal including first information; assigning an IP to only a first device among a plurality of devices and connecting the device; and transmitting a radio packet including data to the first device, wherein when the first device is connected, a second signal is broadcast to block and control an attempt for an automatic wireless connection of another device other than the first device.

15 Claims, 12 Drawing Sheets

(51) Int. Cl.
*H04W 76/14* (2018.01)
*H04W 88/08* (2009.01)

(56) References Cited

U.S. PATENT DOCUMENTS

| | | | | |
|---|---|---|---|---|
| 2013/0148149 | A1 | 6/2013 | Park et al. | |
| 2013/0152167 | A1 | 6/2013 | Park et al. | |
| 2013/0201980 | A1 | 8/2013 | Rahul et al. | |
| 2013/0247079 | A1* | 9/2013 | Zheng | H04N 21/44231 725/14 |
| 2014/0259102 | A1 | 9/2014 | Gunasekara et al. | |
| 2015/0052255 | A1 | 2/2015 | Sun et al. | |
| 2016/0381717 | A1 | 12/2016 | Sunagar et al. | |
| 2018/0324200 | A1* | 11/2018 | Choi | H04W 48/08 |

FOREIGN PATENT DOCUMENTS

| | | |
|---|---|---|
| KR | 10-2013-0066927 | 6/2013 |
| KR | 10-2016-0042994 | 4/2016 |
| KR | 10-2018-0020963 | 2/2018 |
| KR | 10-2021-0015088 | 2/2021 |

OTHER PUBLICATIONS

Hansen et al., "Vendor Specific Request Element," IEEE 802.11-18/0171r2, Jan. 2018, 6 pages.

European Patent Office Application Serial No. 22864968.7, Search Report dated Apr. 8, 2025, 6 pages.

* cited by examiner

FIG. 8

| S. NO. | Order Number | Information Element | Element ID | Unused bits in LENGTH fidld |
|---|---|---|---|---|
| 1 | 4 | SSID | 0 | 2 |
| 2 | 5 | Supported Rates | 1 | 4 |
| 3 | 6 | FH-parameter set | 2 | 5 |
| 4 | 7 | DS parameter set | 3 | 7 |

.
.
.

| | | | | |
|---|---|---|---|---|
| 18 | 21 | RSN | 48 | 0 |
| 19 | 22 | BSS Load | 11 | 5 |
| 20 | 23 | EDCA parameter set | 12 | 3 |
| 21 | 24 | QoS Capability | 46 | 7 |
| 22 | Last | Vendor Specific | 221 | 0 |

DISPLAY DEVICE AND WIRELESS CONNECTION CONTROL METHOD THEREOF

CROSS-REFERENCE TO RELATED APPLICATION(S)

This application is the National Stage filing under 35 U.S.C. 371 of International Application No. PCT/KR2022/012829, filed on Aug. 26, 2022, which claims the benefit of earlier filing date and right of priority to Korean Application No. 10-2021-0116360, filed on Sep. 1, 2021, the contents of which are all hereby incorporated by reference herein in their entireties.

TECHNICAL FIELD

The present disclosure relates to a display device and a wireless connection control method thereof.

BACKGROUND ART

Recently, the functions of terminal are being diversified. For example, there are functions for data and voice communication, photo and video shooting through a camera, voice recording, music file playback through a speaker system, and output of images or videos to a display.

Some terminals add an electronic game play function or perform a multimedia player function.

As the functions of the terminal are diversified, the terminal is implemented with, for example, in the form of a multimedia device (Multimedia player) equipped with complex functions such as shooting still pictures or moving pictures, reproducing music or video files, playing games, receiving broadcasts, or the like.

Furthermore, while it used to be common to utilize the built-in audio output devices of TVs, there has been an increasing demand from users who seek better audio services by connecting various external audio output devices wirelessly.

However, in such environments, TVs face issues where desired services may not be delivered promptly due to problems such as IP conflicts caused by the connection or attempted connection of numerous external devices.

In particular, the handling becomes problematic when there are numerous devices attempting to wirelessly connect with the TV automatically, necessitating a solution to address this issue.

DISCLOSURE

Technical Problem

An object of the present disclosure is to provide a method wherein a display device operating as an access point transitions to function as a station, selectively connecting with one device among multiple devices capable of automatic wireless connection while controlling the automatic wireless connection of the remaining devices.

Technical Solution

According to an aspect of the present disclosure, a method of controlling a wireless connection with a plurality of devices in a display device operating as an access point comprises broadcasting a first signal containing first information; connecting a first device among a plurality of devices by allocating an internet protocol (IP) to only the first device; and transmitting a wireless packet containing data to the connected first device, wherein a second signal is broadcasted to the remaining devices to control a connection of the remaining devices with the display device to be blocked when the display device is connected to the first device.

According to an aspect of the present disclosure, a display device operating as an access point and controlling wireless connection with a plurality of external devices can comprise a memory; and a processor communicating with the memory, wherein the processor is configured to broadcast a first signal containing first information, assign an internet protocol to a specific device and connect to the specific device among the plurality of external devices, transmit a wireless packet containing data to the specific external device, and, when connected to the specific device, broadcast a second signal to control wireless automatic connection attempts by other external devices other than the specific device to be blocked.

Advantageous Effects

According to at least one of the various embodiments of the present disclosure, in an environment using static IPs, a display device operating as an access point assigns a fixed IP to only one device among multiple devices operating as stations and connects, by rejecting an automatic wireless connection of the remaining devices or preventing connection attempts from the remaining devices to ensure automatic wireless connection, thereby eliminating potential issues arising from IP conflicts in advance. This not only enhances user satisfaction by preemptively addressing service utilization concerns but also improves system efficiency.

DESCRIPTION OF DRAWINGS

FIG. 8 is a diagram illustrating a Vendor Specific IE of a beacon frame in relation to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
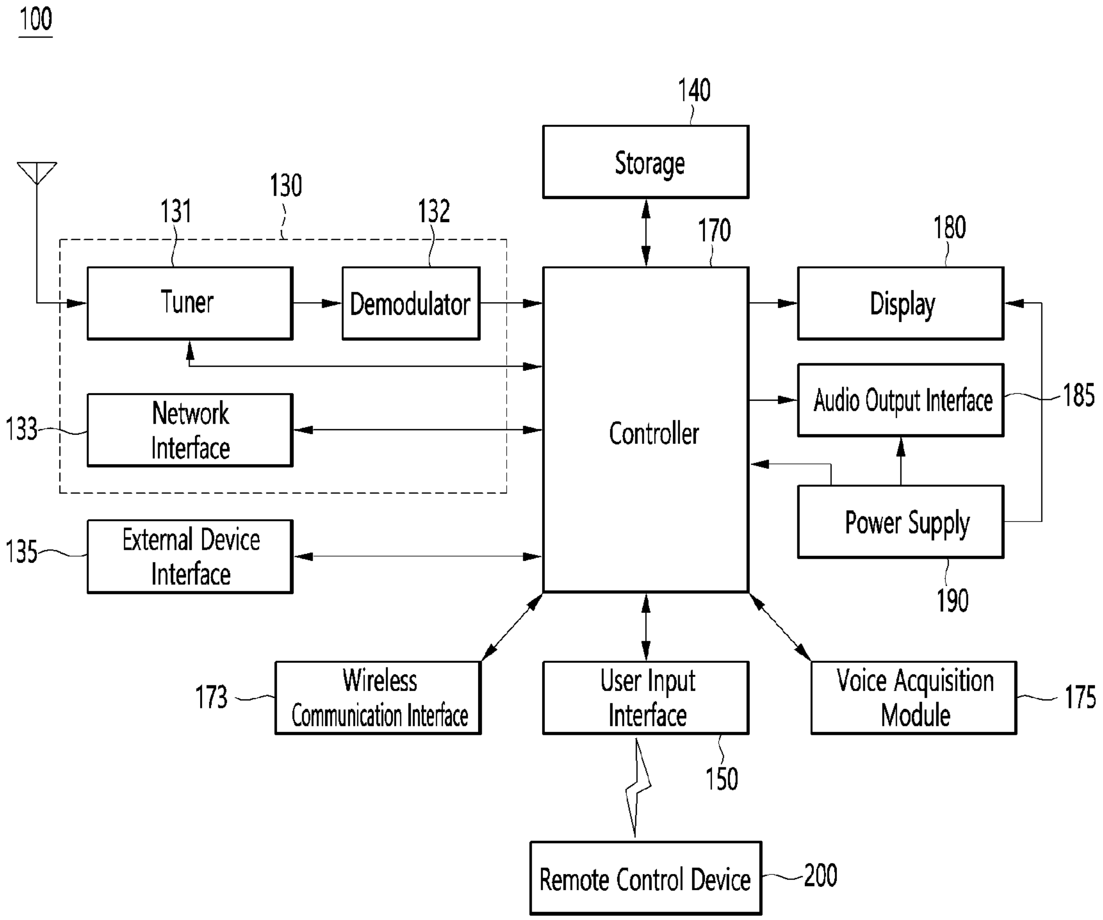
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a microphone 175, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High-Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, some content data stored in the display device 100 may be transmitted to another user registered in advance in the display device 100 or a selected user or a selected electronic device among other users or other electronic devices.

The network interface 133 may access a predetermined web page through the connected network or the other network linked to the connected network. That is, it is possible to access a predetermined web page through a network, and transmit or receive data to or from a corresponding server.

Then, the network interface 133 may receive contents or data provided from a content provider or a network operator. That is, the network interface 133 can receive content such as movies, advertisements, games, VODs (Video on Demands), and broadcast signals, which are provided from a content provider or a network provider, through network and information relating thereto.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a Ultra Wideband (UWB) communication method, a ZigBee communication method, a Radio Frequency (RF) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), UWB, ZigBee, Near Field Communication (NFC), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the other display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

Unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
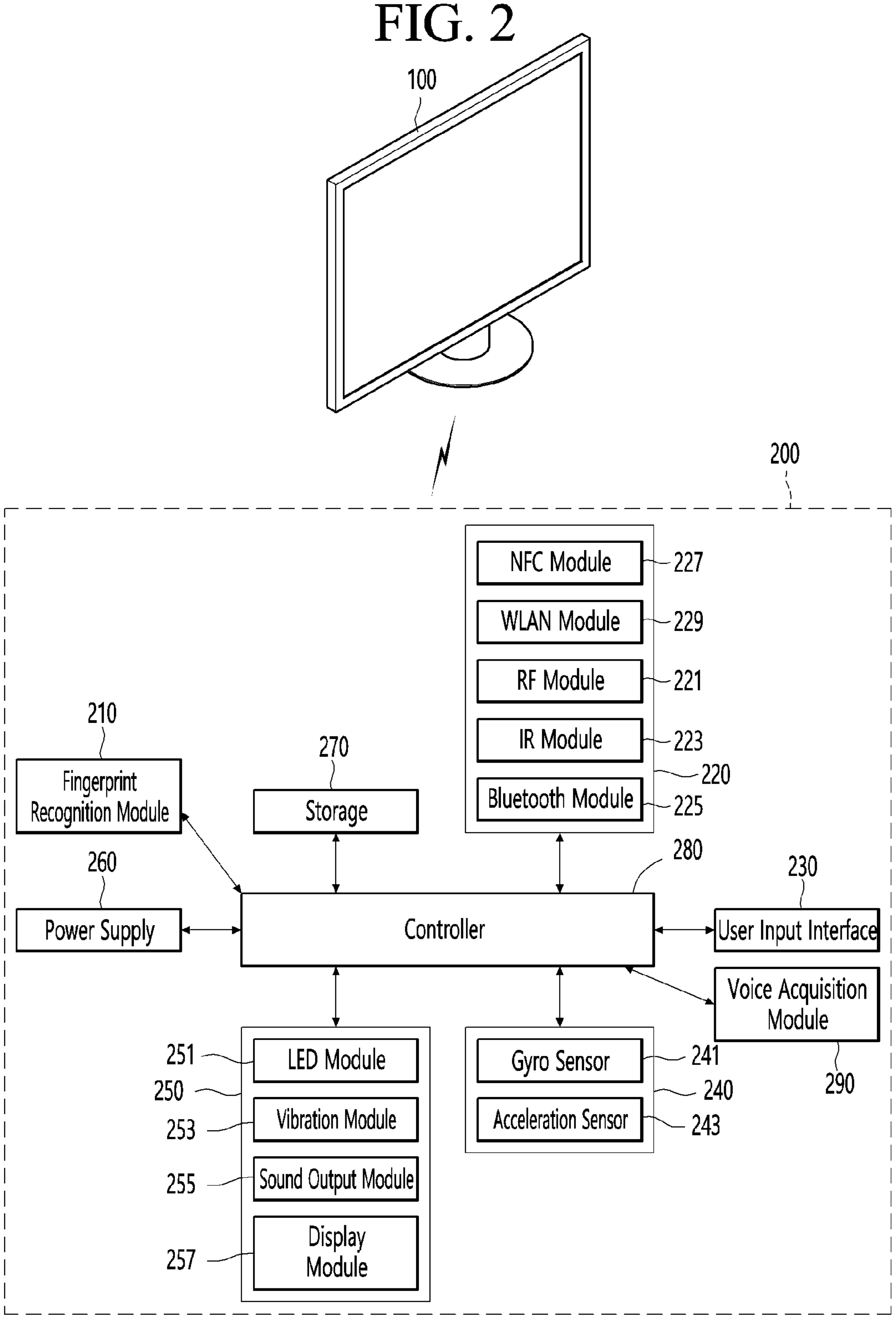
FIG. 2 is a block diagram of a remote control device according to an embodiment of the present disclosure.
Figure 3:
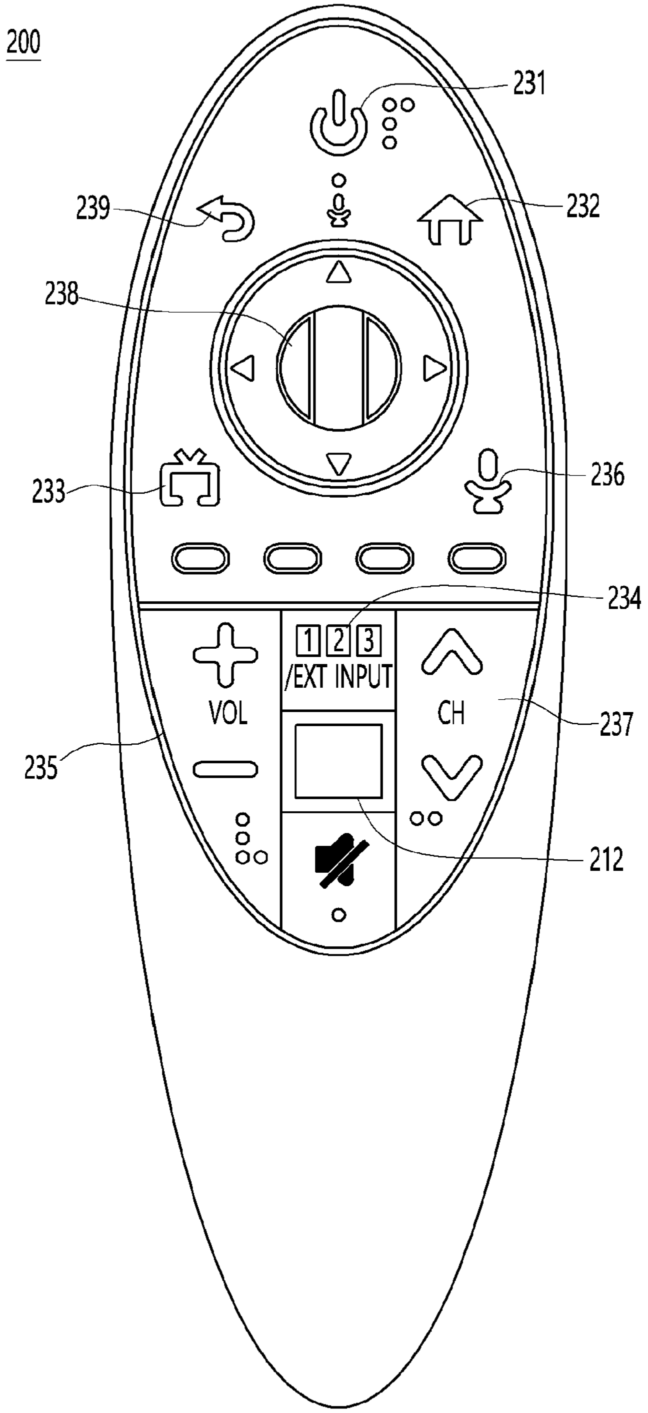
FIG. 3 illustrates an example of an actual configuration of a remote control device according to an embodiment of the present disclosure.

FIG. 2 is a block diagram of a remote control device according to an embodiment of the present disclosure, and FIG. 3 illustrates an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC communication standard, and a WLAN circuit 229 capable of transmitting and receiving signals to and from the display device 100 according to the WLAN communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication circuit 220.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication circuit 220.

Also, the microphone 290 of the remote control device 200 may obtain a speech.

A plurality of microphones 290 may be provided.

Next, a description will be given referring to FIG. 4.

Figure 4:
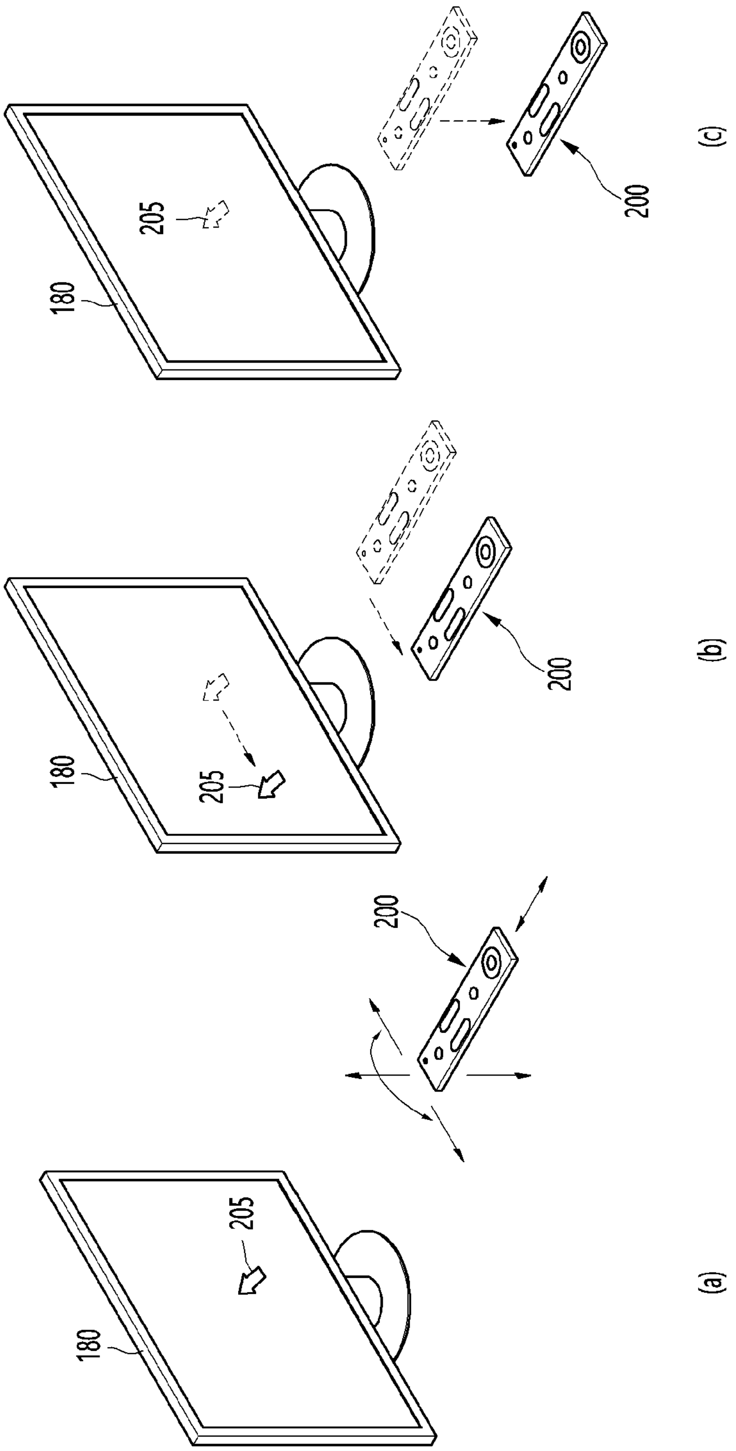
FIG. 4 illustrates an example of using a remote control device according to an embodiment of the present disclosure.

FIG. 4 illustrates an example of using a remote control device according to an embodiment of the present disclosure.

In FIG. 4(*a*), it is illustrated that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In FIG. 4(*b*), it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In FIG. 4(*c*), it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and the forward and backward movements may be recognized. In a state in which a specific button in the remote control device 200 is not being pressed, the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
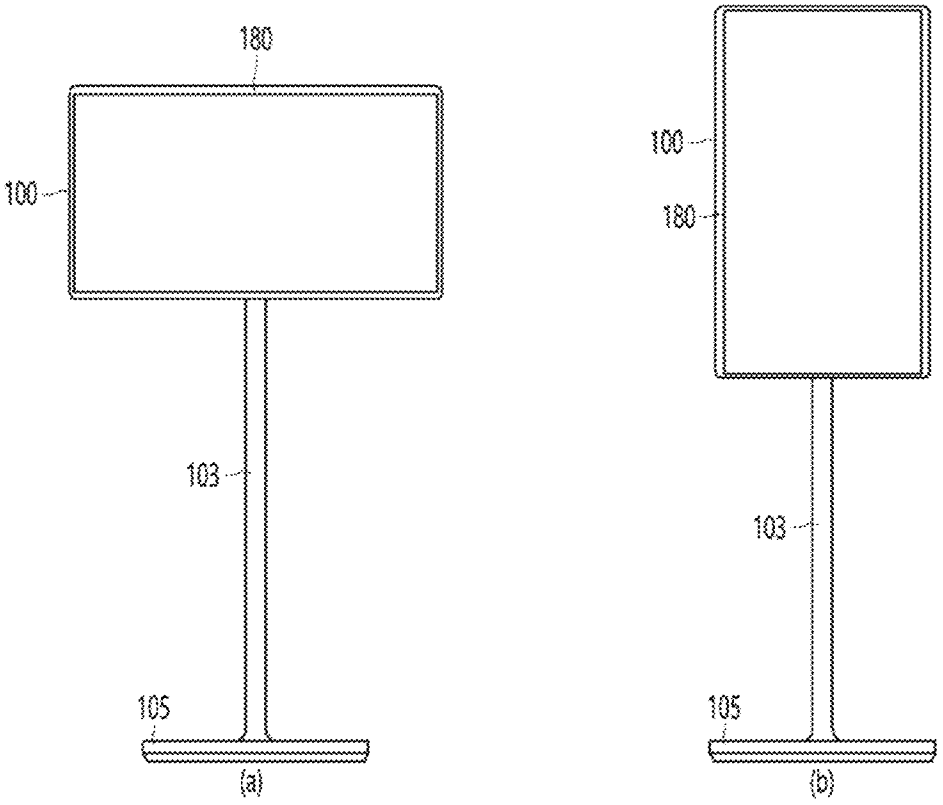
FIGS. 5(*a*) and 5(*b*) are diagrams for illustrating a horizontal mode and a vertical mode of a stand-type display device according to an embodiment of the present disclosure.

FIGS. 5(*a*) and 5(*b*) are diagrams for describing a horizontal mode and a vertical mode of a stand-type display device according to an embodiment of the present disclosure.

Referring to FIGS. 5(*a*) and 5(*b*), a stand-type display device 100 is illustrated.

A shaft 103 and a stand base 105 may be connected to the display device 100.

The shaft 103 may connect the display device 100 and the stand base 105 to each other. The shaft 103 may extend vertically.

The lower end of the shaft 103 may be connected to the edges of the stand base 105.

The lower end of the shaft 103 may be rotatably connected to the edges of the stand base 105.

The display device 100 and the shaft 103 may rotate about a vertical axis with respect to the stand base 105.

An upper portion of the shaft 103 may be connected to the rear surface of the display device 100.

The stand base 105 may serve to support the display device 100.

The display device 100 may be configured to include the shaft 103 and the stand base 105.

The display device 100 may rotate around a point where the upper portion of the shaft 103 and the rear surface of the display 180 contact each other.

FIG. 5(*a*) illustrates that the display 180 operates in a landscape mode in which the horizontal length is greater than the vertical length, and FIG. 5(*b*) illustrates that the display 180 operates in a portrait mode in which the vertical length is greater than the horizontal length.

A user may move while holding a stand-type display device. That is, the stand-type display device has improved mobility, unlike a fixed device, so that a user is not limited by an arrangement position.

The display device 100 according to an embodiment of the present disclosure can support automatic wireless connection.

In this case, the automatic wireless connection can occur in environments using both dynamic and static IPs. However, it is noted that in environments utilizing dynamic IPs, there is a disadvantage compared to static IP environments in that the IP allocation process takes longer, resulting in delayed service delivery. Therefore, for the sake of convenience, the following disclosure focuses on describing automatic wireless connection control in environments using static IPs. However, in environments utilizing static IPs where fixed IP addresses are used, the display device 100 may have multiple devices connected due to automatic wireless connection requests, posing a risk of IP conflicts. Thus, appropriate handling is required.

Therefore, the present disclosure describes the allocation and removal of control information dynamically by the display device 100 operating as an access point (AP) in an environment using static IPs, to control automatic wireless connection of devices.

According to an embodiment of the present disclosure, in the environment using static IPs, only one device is automatically wirelessly connected to the display device 100 (SoftAP), while controlling the remaining devices no longer automatic wireless connection or connection attempts, thereby preventing problems caused by IP conflicts proactively.

Meanwhile, although not specifically explained below, an environment using a static IP is assumed, but is not necessarily limited to this.

Figure 6:
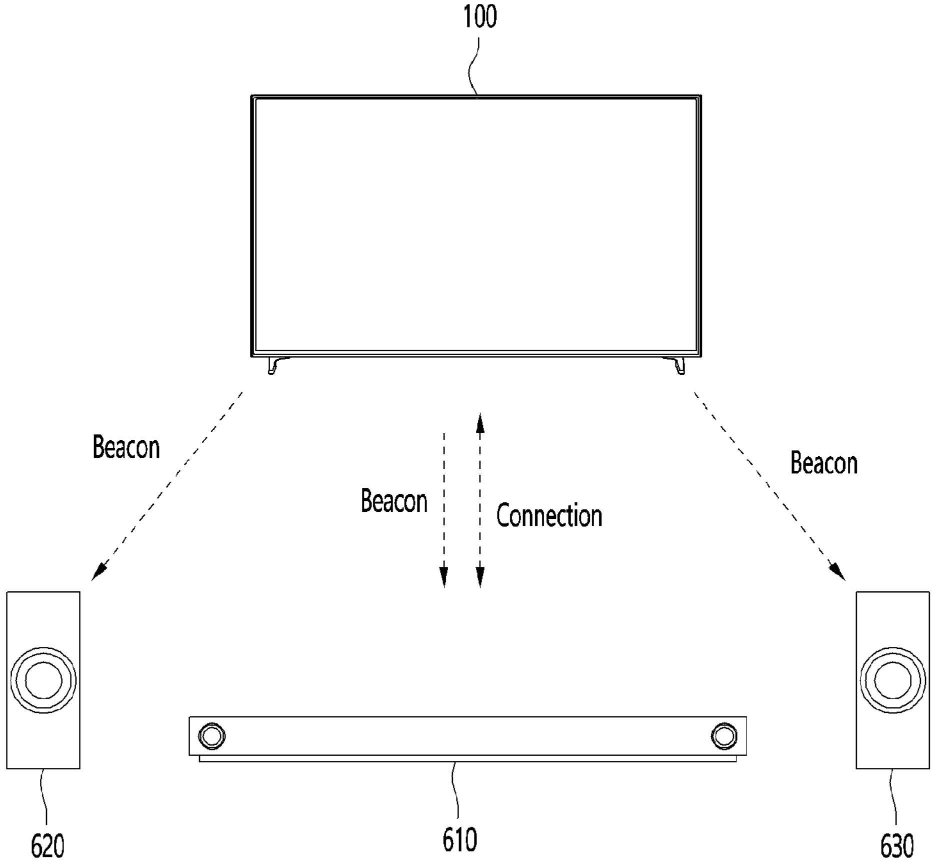
FIG. 6 is a diagram illustrating an automatic wireless connection control process of a display device and devices according to an embodiment of the present disclosure.

FIG. 6 is a diagram illustrating an automatic wireless connection control process between the display device 100 and devices according to an embodiment of the present disclosure.

Figure 7:
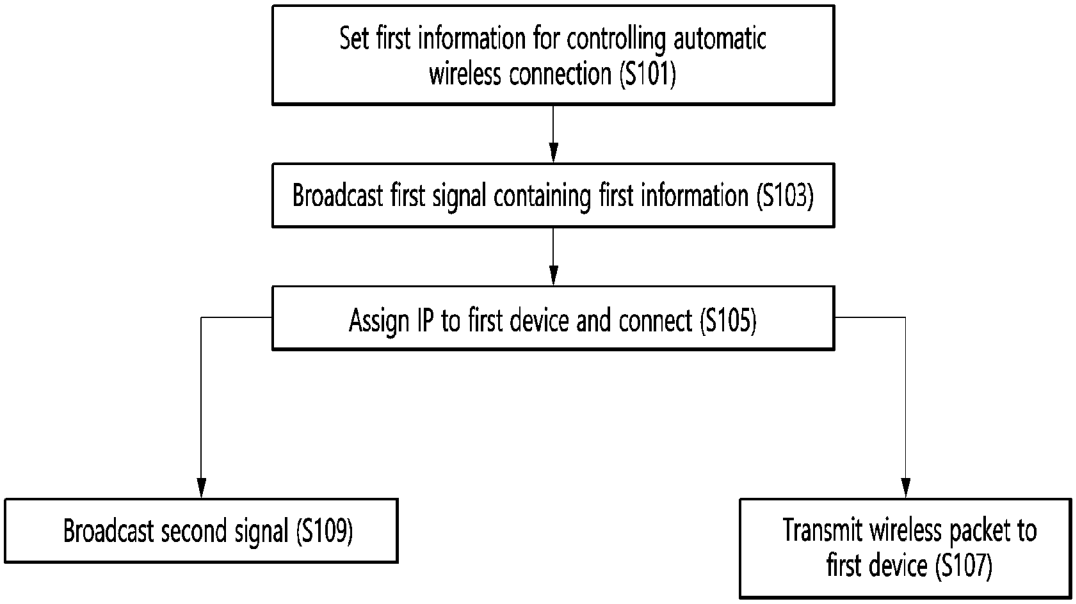
FIG. 7 is a flowchart illustrating a method of controlling automatic wireless connection in a display device according to an embodiment of the present disclosure.

FIG. 7 is a flowchart illustrating a method of controlling automatic wireless connection in the display device 100 according to an embodiment of the present disclosure.

First, referring to FIG. 6, a display device 100 operating as an access point (SoftAP) and peripheral devices 610-630 which are capable of automatic wireless connection are shown.

In the above, in addition to the display device 100 operating as the access point (SoftAP), peripheral devices 610-630 which are capable of automatic wireless connection may be referred to as devices operating as stations.

Referring to FIG. 7, the process of controlling automatic wireless connection of devices 610-630 operating as the stations in the display device 100 operating as the access point (SoftAP) in the situation of FIG. 6 will be described as follows.

The display device 100 operating as the access point (SoftAP) may set first information for automatic wireless connection between devices 610-630 operating as stations (S101).

The display device 100 may broadcast a first signal containing first information (S103).

In the above, the first signal may be a beacon frame.

And, the first information may be a value of wireless automatic connection control information. The value, for example, may be a value of a Vendor Specific IE (Information Element) in an option field in a beacon frame format shown in FIG. 8.

According to an embodiment of the present disclosure, the value of the Vendor Specific IE shown in FIG. 8, to which '221' is assigned as an element ID (element IDentifier), may dynamically be changed and set by the access point (SoftAP) based on the wireless connection status between devices operating as stations. On the other hand, in the present disclosure, automatic wireless connection is controlled using a Vendor Specific IE as an example, but is not limited thereto. For instance, other IEs or other information in the beacon frame format can be used.

Accordingly, the display device 100 may set the value of the first information, that is, the Vendor Specific IE, set in step S101 to a value indicating that a state of the wireless automatic connection is activated or ready to connect.

Meanwhile, the access point is the display device 100, but is not limited thereto. For example, as will be described later, at least one of external terminals other than the display device 100 may operate as the access point (SoftAP).

After broadcasting the first signal containing the first information in step S103, the display device 100 may wait for a response from the devices 610-630 operating as stations.

When the response, that is, an IP allocation request signal for automatic wireless connection, is received from one device (the first device) among the devices 610-630 operating as stations, the display device 100 can allocate an IP to only the first device and perform an inter-connection process can be performed by allocating an IP only (S105).

Referring to FIG. 6, the display device 100 operating as the access point (SoftAP) can broadcast a first signal containing first information, that is, a beacon frame. When the first device 610 among devices 610-630 operating as stations transmits a response signal in response to the broadcasted first signal, the display device 100 can allocate a fixed IP to the first device 610 and connect to the first device 610.

When the display device 100 is interconnected with the first device 610 via the assigned fixed IP, the display device 100 can broadcast a second signal to block automatic wireless connection attempts from other devices operating as stations (e.g., 620 and 630).

At this time, the second signal may also be a beacon frame.

Meanwhile, according to an embodiment of the present disclosure, the second signal may include second information.

In the above, the second information, like the first information, may be a Vendor Specific IE in the option field in the beacon frame format shown in FIG. 8, but a value of the second information may be different from that of the first information. For example, if the first information is a value representing a request for automatic wireless connection or automatic wireless connection attempts by a device operating as a station, the second information may be a value that rejects or prevents automatic wireless connection or automatic wireless connection attempts by the device operating as the station.

With reference to the above-described embodiment, a value of the Vendor Specific IE may be defined as follows. However, this is only an example, and the present disclosure is not limited thereto.

TABLE 1

| Vendor Specific IE | Meaning |
|---|---|
| 0x00 | Rejection (or Prevention) of Automatic wireless connection or automatic wireless connection attempt or Reserved |
| 0x01 | Automatic wireless connection request |
| 0x10 | Automatic wireless release request |
| 0x11 | Reserved |

Accordingly, the display device 100 may set '0x01' as a value of Vendor Specific IE as the first information, and '0x00'(or '0x11') as a value of the Vendor Specific IE as the second information. Each of the first and second information is included in the first signal and the second signal, respectively, and the respective signals is broadcasted.

As shown in Table 1, values '0x00' and '0x11' are defined by the display device 100 as 'Reserved', respectively. Devices operating as stations do not perform automatic wireless connection or connection attempt when a value of the Vendor Specific IE included in the broadcasted signals is one of '0x00' and '0x11' as defined above.

Meanwhile, a value '0x10' is defined by the display device 100 as the value of the Vendor Specific IE as requesting an automatic wireless release (or disconnect). Through that, the display device can operate a process for releasing the wirelessly connected device at present. In other words, the display device 100 use, for example, the value of the Vendor Specific IE when the currently automatically wirelessly connected device is an undesired device.

According to another embodiment of the present disclosure, unlike shown in Table 1, when a static IP is assigned to the first device 610 in step S105, the display device 100 may transmit a second signal not including second information. Or, the display device 100 can broadcast a second signal which carries a beacon frame removed the Vendor Specific IE. That is, the display device 100 can broadcast the beacon frame with the Vendor Specific IE removed or deactivated as the second signal so that it is blocked automatic wireless connection or connection attempts by other devices 620 and 630. Through that, it is prevented IP duplication due to duplicate allocation of static IPs in advance in a static IP environment.

The display device 100 can transmit a wireless packet containing data to the first device 610 when the display device 100 is connected to the first device 610 by assigning a static IP in step S105 (S109).

For example, step S109 may be performed together with step S107 described above.

Meanwhile, a format of the wireless packet in step S109 may be different from that of the second signal in step S107. For example, the format of the second signal in step S107 can be still the beacon frame format like the first signal, but the format of the wireless packet in step S109 is not a beacon frame but a wireless packet based on a communication protocol according to a connection method after the fixed IP allocation.

In the present disclosure, one of Wi-Fi, Bluetooth, and UWB may be used for automatic wireless connection, but is not limited to thereto.

According to an embodiment of the present disclosure, the display device 100 may use a dongle, for example, when automatically and wirelessly connected with a specific device (e.g., a sound bar) for the first time. At this time, the dongle may include link information such as identifier information of specific device(s) or media access control (MAC) address information. Accordingly, the display device 100 to which the dongle is coupled can automatically establish a wireless automatic connection with the linked specific device (e.g., the first device 610) corresponding to the link information included in the dongle when the linked specific device is turned on. As described above, the display device 100 may not use the first information or the second information so as to control automatic wireless connection with the linked first device 610 when a dongle is attached to the display device 100.

Meanwhile, the display device 100 may release a connection with the specific device by resetting the dongle or guiding a power of the specific device to be turned off.

According to another embodiment of the present disclosure, the display device 100 may transmit a beacon frame in a uni-cast manner rather than broadcasting the beacon frame or using a dongle. At this time, the beacon frame transmitted in the unicast manner may include the first information. And, the first information may be corresponded to a Vendor Specific IE and its value may be '0x01'(i.e., automatic wireless connection request). The display device 100 can use the unicast method in cast that information about a device for which automatic wireless connection is desired, such as access information, device identifier information, or MAC address information is known by the display device 100 in advance.

Figure 9:
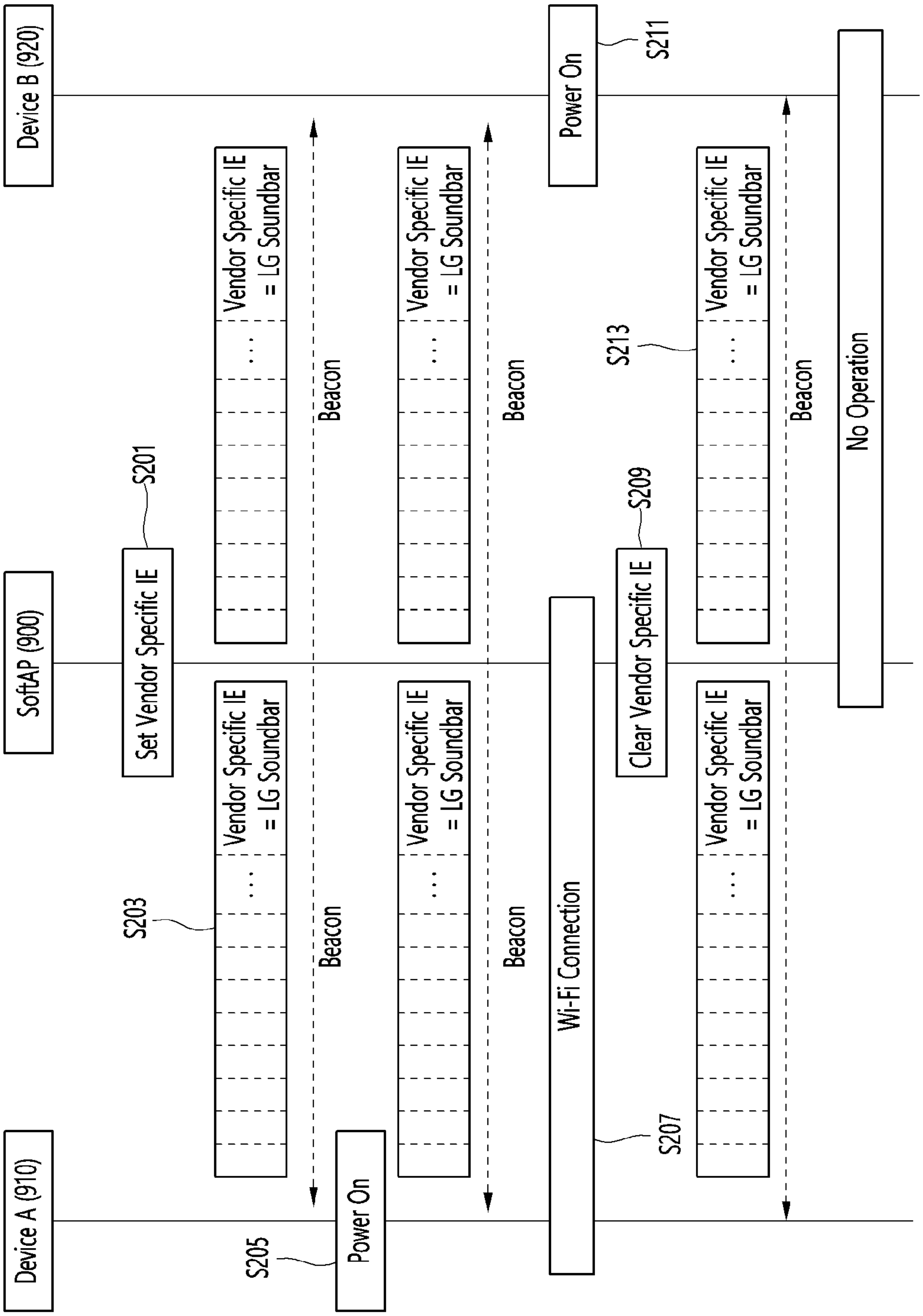
FIG. 9 is a flowchart illustrating a process of an automatic wireless connection control of a plurality of devices operating as stations in SoftAP according to an embodiment of the present disclosure.

Referring to FIG. 9, the process of controlling automatic wireless connection between device A (910) and device B (920) by SoftAP 900 is described as follows.

At this time, the SoftAP 900 may be a display device (100), a smart phone, and the like, but is not limited to thereto.

The SoftAP 900 can set a value of the Vendor Specific IE of the beacon frame (S201).

At this time, the value of the Vendor Specific IE set above may be the '0x01' value in Table 1 as described above. The value is a value corresponding to an automatic wireless connection request.

After setting the value of Vendor Specific IE, the SoftAP 900 can broadcast the corresponding beacon frame (S203).

Step S203 may continue to be performed until the SoftAP 900 receives a response corresponding to the broadcast of the beacon frame from one device.

In this situation, when a device A (910) is powered on (S205), the device A (910) can receive a beacon frame broadcasted by the SoftAP 900 and parses the beacon frame. Thus, the device A (910) can generate a response signal in accordance with a value of the Vendor Specific IE and transmitted it to the SoftAP 900. At this time, a format of the response signal may also be in a beacon frame format, but is not limited thereto.

When a response signal is received from the device A (910) after power-on (S205), the SoftAP 900 can assign an IP to the device A (910) and establishes a mutual wireless connection (e.g., a Wi-fi connection) with the device A. Thus, the SoftAP 900 can transmit a wireless packet containing data to the device A (910) (S207). At this time, the device A (910) may also transmit data to the SoftAP 900 through the assigned IP, if necessary.

When the SoftAP 900 establishes automatic wireless connection with device A (910) through step S207, it can clear the value of the first information, that is, the value of the Vendor Specific IE set in step S201 (S209).

Here, for instance, referring to Table 1 above, the term 'clear' may indicate setting the value to '0x00' or '0x11', which means deleting the Vendor Specific IE, etc.

If device B (920) is powered on after the SoftAP 900 is automatically wirelessly connected to device A (910) (S211), the SoftAP 900 can receive vendor specific information in step S209. After clearing the element, a beacon frame can be broadcast (S213).

According to an embodiment of the present disclosure, in case the SoftAP 900 receives a signal in accordance with power-on from another device (e.g., a device B 920) while staying a statue of clearing a value of the Vendor Specific IE through step S209, the SoftAP 900 transmits a beacon frame for rejecting an automatic wireless connection rejection or preventing automatic wireless connection attempt, thereby controlling any operation related to automatic wireless connection between the SoftAP 900 and another device 920 not to perform (No operation).

According to another embodiment of the present disclosure, the SoftAP 900 may include information on requesting power-on of a device operating as a station that is preregistered in the network in a beacon frame. At this time, the information on requesting power-on can also be defined as a value of the Vendor Specific IE. For example, referring to Table 1, the value '0x11', which was defined as 'Reserved', can be defined and used as the power-on request. Therefore, the SoftAP 900 can initially transmit a beacon frame including a power-on request ('0x11') as the value of the vendor-specific information element in step S201 (S203). And then when a power-on response is received from at least one device, another beacon frame containing the value of the Vendor Specific IE for an automatic wireless connection request ('0x01') may be broadcast at that time again. This can be performed when a response signal is not received from any device within a predetermined time despite broadcasting the beacon frame containing the automatic wireless connection request in step S203. However, it is not limited to the above examples.

According to an embodiment of the present disclosure, the Vendor Specific IE can be defined and used in various ways as shown below in addition to Table 1 depending on the SoftAP.

Table 2 includes IP address information assigned as a Vendor Specific IE value, and connection may be requested through it.

TABLE 2

| Vendor Specific IE | Meaning |
|---|---|
| 0x00 | Reserved or Invalid IP address |
| 0x01 | Valid IP address |
| 0x10 | Reserved |
| 0x11 | Reserved |

Referring to FIG. 9 and Table 2, the SoftAP 900 transmits a beacon frame containing a fixed IP that can be pre-assigned from the beginning, that is, valid IP address information ('0x01'), as a Vendor Specific IE value in step S201. And later, when it is cleared after being connected to at least one device, a beacon frame containing a vendor-specific information element set to a different value ('0x00', '0x10', or '0x11') is transmitted to automatically enable other devices. You can also reject wireless connections or prevent connection attempts. At this time, if the value of the Vendor Specific IE above is '0x00', 'Invalid IP address' can be included to prevent wireless connection from being established with the SoftAP 900 despite automatic wireless connection attempts.

Table 3 defines that allows the SoftAP to designate a type of device for which automatic wireless connection is desired.

TABLE 3

| Vendor Specific IE | Meaning |
|---|---|
| 0x00 | Reserved |
| 0x01 | Sound bar |
| 0x10 | Smart Phone |
| 0x11 | Reserved |

Referring to FIG. 9 and Table 3, the SoftAP 900 can transmit a beacon frame containing device information of the type for which automatic wireless connection is desired from the beginning as a value of Vendor Specific IE ('0x01') in step S201. Later, when cleared after connected to at least one device, a beacon frame containing a vendor-specific information element set to a different value ('0x00' or '0x11') is transmitted so as to reject to another device's automatic wireless connection or prevent to another device's automatic wireless connection attempts.

Table 4 defines a desired type of a communication protocol for automatic wireless connection by the SoftAP.

TABLE 4

| Vendor Specific IE | Meaning |
|---|---|
| 0x00 | Reserved |
| 0x01 | Wi-fi |
| 0x10 | Bluetooth ™ |
| 0x11 | UWB |

Referring to FIG. 9 and Table 4, the SoftAP 900 can transmit a beacon frame containing desired communication protocol type information for automatic wireless connection from the beginning as a value of Vendor Specific IE in step S201 (e.g., if a Wi-Fi wireless connection is desired the value of the Vendor Specific IE is '0x01' or if a Bluetooth wireless connection is desired the value of the Vendor Specific IE is '0x10'). Later, when cleared after connected to at least one device, a beacon frame containing a vendor-specific IE set to a different value ('0x00' or '0x11') is transmitted so as to reject to another device's automatic wireless connection or prevent to another device's automatic wireless connection attempts.

Table 5 defines a desired manufacturer of the device for automatic wireless connection by the SoftAP.

TABLE 5

| Vendor Specific IE | Meaning |
|---|---|
| 0x00 | Reserved |
| 0x01 | LG Electronics |
| 0x10 | Reserved |
| 0x11 | Reserved |

Referring to FIG. 9 and Table 5, the SoftAP 900 can transmit a beacon frame containing manufacturer information for automatic wireless connection with a device manufactured by the desired manufacturer from the beginning as a value of Vendor Specific IE value ('0x01') in step S201. Later, when cleared after connected to at least one device, a beacon frame containing a Vendor Specific IE set to a different value ('0x00', '0x10', or '0x11') is transmitted so as to reject to another device's automatic wireless connection or prevent to another device's automatic wireless connection attempts.

Table 6 defines identification information of a desired device for automatic wireless connection by the SoftAP.

TABLE 6

| Vendor Specific IE | Meaning |
|---|---|
| 0x00 | Reserved |
| 0x01 | ID1 |
| 0x10 | ID2 |
| 0x11 | Reserved |

Referring to FIG. 9 and Table 6, the SoftAP 900 can transmit a beacon frame containing identification information of a desired device from the beginning as a value of Vendor Specific IE in step S201 (e.g., if an identifier of a desired device is ID1 the value of the Vendor Specific IE is '0x01' or if an identifier of a desired device is ID2 the value of the Vendor Specific IE is '0x10'). Later, when cleared after connected to at least one device, a beacon frame containing a Vendor Specific IE is set to a different value ('0x00', '0x10', or '0x11') Is transmitted so as to reject to another device's automatic wireless connection or prevent to another device's automatic wireless connection attempts. In the above, the identification information is not necessarily limited to an identifier (ID). In other words, unique values of each device such as MAC address information can be included in the identification information.

In addition, according to another embodiment of the present disclosure, the value of the Vendor Specific IE may be defined as a combination of the values defined in Tables 1 to 6 described above as long as there is no conflict. Using this, the SoftAP can, for example, control the process for automatic wireless connection with a desired device manufactured by a desired manufacturer using a desired wireless connection method.

Figure 10:
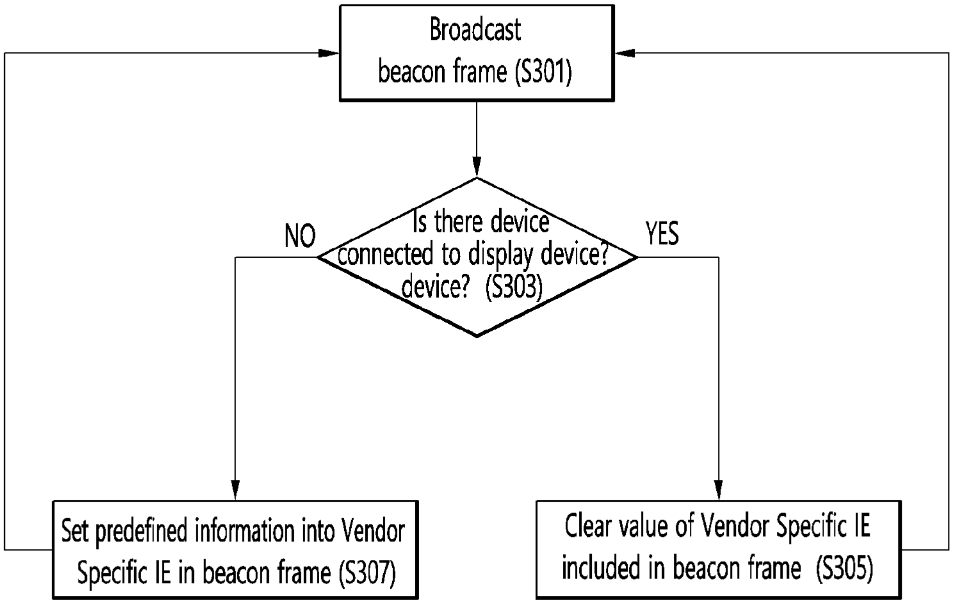
FIG. 10 is a flowchart illustrating performing a process of automatic wireless connection in a device operating as SoftAP according to an embodiment of the present disclosure.

FIG. 10 illustrates, for example, subsequent actions are specified after a device operating as the SoftAP, that is, the display device 100, can broadcast (S301) a beacon frame containing first information including specific value defined in Tables 1 to 6 as in step S201 of FIG. 9.

Referring to FIG. 10, after broadcasting the beacon frame (S301), the display device 100 can determine whether a response signal of the beacon frame broadcasted periodically or aperiodically, that is, a device responding to a connection request exists (S303). In other words, the display device 100 can broadcast the beacon frame and determine whether there is a wirelessly connected device after IP allocation according to a response of the device operating as a station.

If there is a previously connected device as a result of the determination in step S303, the display device 100 may clear the value of the Vendor Specific IE included in the beacon frame (S305).

However, if there is no previously connected device as the result of the determination in step S303, the display device 100 may set the value of the Vendor Specific IE included in the beacon frame to any one value as defined in Tables 1 to 6 (S307).

The display device 100 may broadcast the beacon frame again after step S305 or step S307. In the former case, automatic wireless connection with other devices will be rejected. However, in the latter case, automatic wireless connection with one device among other devices will be approved.

Although not shown, if the previously connected device is an undesired device, the display device 100 can perform the flow of FIG. 10 again after requesting the wireless connection release ('0x10' in Table 1), in step S305 to perform automatic wireless connection with the desired device or attempt automatic wireless connection with the desired device.

Figure 11:
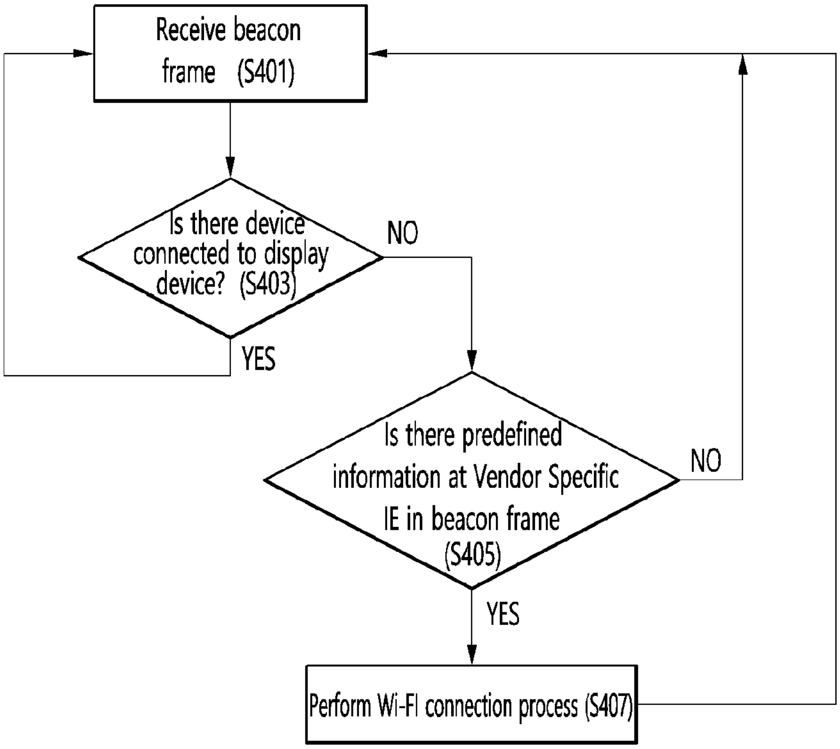
FIG. 11 is a flow chart illustrating performing a process for an automatic wireless connection in a device operating as a station according to an embodiment of the present disclosure.

FIG. 11 is a flow chart illustrating an automatic wireless connection process is performed in a device operating as a station.

Referring to FIG. 11, when a beacon frame is received from the SoftAP (S401), each device operating as a station can parse the beacon frame to determine whether there is a connected device with SoftAP (S403).

This can be identified by parsing the beacon frame received from SoftAP in each device operating as a station. As an example, referring to Table 1, it is possible to identify whether a value of the Vendor Specific IE included in the parsed beacon frame is '0x00', '0x10', '0x11', or '0x10'.

As a result of determining whether there is a device connected to SoftAP by parsing the beacon frame in each device operating as a station, if it is determined that there is no device connected to SoftAP, it can be determined whether the value of the Vendor Specification IE included in the parsed beacon frame is predefined value, that is, '0x10' (S405).

As a result of the determination in step S405 in each device operating as a station, if the value of the Vendor Specific IE included in the beacon frame is a predefined value, each device can establish a process for wireless connection with SoftAP (e.g., Wi-Fi connection) because each device can connect to SoftAP (S407).

Figure 12:
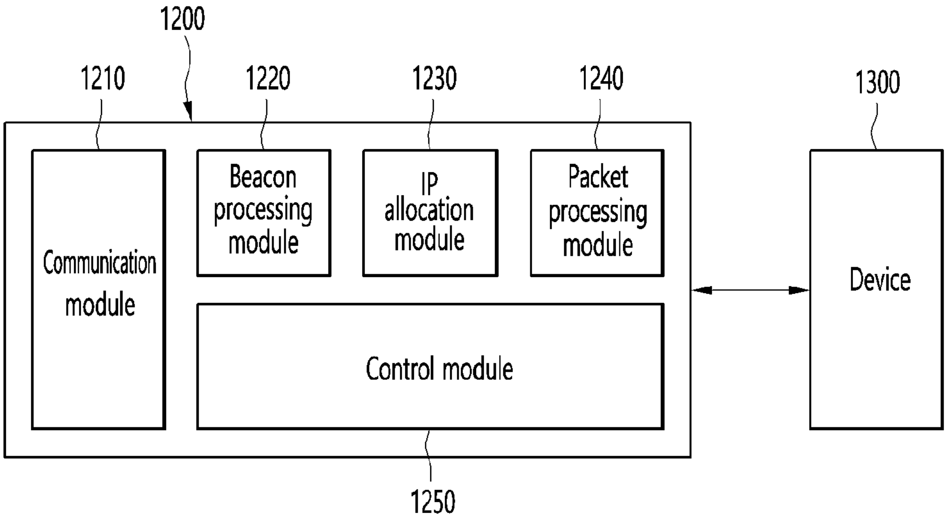
FIG. 12 illustrates a block diagram of a display device for automatic wireless connection control according to an embodiment of the present disclosure.

FIG. 12 illustrates a block diagram of a processor 1200 for controlling automatic wireless connection with a device according to an embodiment of the present disclosure.

At this time, the processor 1200 may be a component of the display device 100 shown in FIG. 1. The processor 1200 may perform data communication with the device 1300 by performing a predefined communication protocol, for example, Wi-Fi wireless connection.

Referring to FIG. 12, the processor 1200 may be configured to include a communication module 1210, a beacon processing module 1220, an IP allocation module 1230, a packet processing module 1240, a control module 1250, etc. Some of these components may correspond to or replace the components of FIG. 1 described above.

The communication module 610 can support a wireless communication protocol and can collect or receive data through data communication with at least one device 1300.

The beacon processing module 1220 can generate a beacon frame. At this time, the beacon processing module 1220 may ensure that the beacon frame includes first information and/or second information. The first information and second information may refer to the above-described embodiment.

The IP allocation module 1230 can assign a fixed IP address to the device 1300 in a static IP environment. According to an embodiment of the present disclosure, the fixed IP address information may be included in a beacon frame generated by the beacon processing module 1220 and broadcast as described above.

The packet processing module 1240 may generate a wireless packet containing data to be transmitted to the automatically wirelessly connected device 1300. Depending on the automatically wirelessly connected device 1300, wireless packets generated by the packet processing module 1240 may vary. For example, if the wirelessly connected device 1300 is an audio output device such as a sound bar, the packet processing module 1240 may generate a wireless packet containing audio data.

The control module 1250 can be responsible for overall control of the operation of the process 1200.

In an environment using a static IP according to the present disclosure described above, a display device operating as an access point can assign a fixed IP to only one device among a plurality of devices operating as stations. The display device can connect to the one device assigned the fixed IP, and reject automatic wireless connection or prevent automatic wireless connection attempts by the remaining devices. Thus, since problems caused by IP conflicts are eliminated in advance, not only satisfaction with service use but also system efficiency can be improved.

According to an embodiment of the present invention, the above-described method can be implemented as processor-readable code on a program-recorded medium. Examples of media that the processor can read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications can be made.

INDUSTRIAL APPLICABILITY

Since a display device operating as an access point according to an embodiment of the present disclosure, one device among a plurality of devices operating as stations is assigned an IP and connected to it, and the rest of the plurality of devices are reject automatic wireless connection or prevent automatic wireless connection attempts, problems caused by IP conflicts are eliminated in advance, not only satisfaction with service use but also system efficiency can be improved. Accordingly, the present disclosure has an industrial applicability.

What is claimed is:

1. A method of controlling a wireless connection with a plurality of devices by a display device operating as an access point, comprising:

broadcasting a first signal containing first information to the plurality of devices;

connecting a first device among the plurality of devices by allocating an internet protocol (IP) to only the first device; and transmitting a wireless packet containing data to the connected first device, wherein a second signal is broadcasted to remaining devices of the plurality of devices to block automatic wireless connection attempts of the remaining devices with the display device when the display device is connected to the first device.

2. The method of claim 1, wherein both the first and second signals are a beacon frame.

3. The method of claim 2, wherein the first information includes a value of a Vendor Specific Information Element of a beacon frame format related to an automatic wireless connection.

4. The method of claim 3, wherein a value of the Vendor Specific Information Element of the beacon frame format is a value which corresponds to automatic wireless connection activation or automatic wireless connection ready state.

5. The method of claim 3, wherein a value of the Vendor Specific Information Element of the beacon frame format is a value which corresponds to an identifier for the display device subject to automatic wireless connection.

6. The method of claim 3, wherein a value of the Vendor Specific Information Element of the beacon frame format is a value which corresponds to a type of device subject to automatic wireless connection.

7. The method of claim 3, wherein a value of the Vendor Specific Information Element of the beacon frame format is a value which corresponds to an identifier for a manufacturer of the display device subject to automatic wireless connection.

8. The method of claim 3, wherein a value of the Vendor Specific Information Element of the beacon frame format is a value which corresponds to a type of communication protocol for wireless connection.

9. The method of claim 3, wherein the first information includes power-on request information of the first device.

10. The method of claim 3, wherein the second signal includes second information having a value of the Vendor Specific Information Element of the beacon frame format being a value which corresponds to automatic wireless connection deactivation.

11. The method of claim 1, wherein the display device includes a dongle for the automatic wireless connection, and wherein the first device is a device linked to the dongle.

12. The method of claim 1, wherein the automatic wireless connection is performed based on at least one communication protocol among Wi-Fi, Bluetooth and UWB.

13. The method of claim 1, wherein the display device operates as a soft access point (SoftAP).

14. The method of claim 1, wherein the IP is a fixed IP assigned in a static IP environment.

15. A display device operating as an access point and controlling wireless connection with a plurality of external devices, comprising:

a memory; and a processor communicating with the memory, wherein the processor is configured to:

broadcast a first signal containing first information to the plurality of external devices, assign an internet protocol to a specific device and connect to the specific device among the plurality of external devices, transmit a wireless packet containing data to the specific external device, and, when connected to the specific device, broadcast a second signal to block automatic wireless connection attempts by other external devices other than the specific device.

* * * * *